(12) United States Patent
Maekawa et al.

(10) Patent No.: US 11,209,794 B2
(45) Date of Patent: Dec. 28, 2021

(54) ABNORMALITY DETERMINATION APPARATUS, NON-TRANSITORY COMPUTER READABLE MEDIUM ENCODED WITH A PROGRAM, ABNORMALITY DETERMINATION SYSTEM AND ABNORMALITY DETERMINATION METHOD

(71) Applicant: FANUC CORPORATION, Yamanashi (JP)

(72) Inventors: Susumu Maekawa, Yamanashi (JP); Hirohide Tsunoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/244,786

(22) Filed: Jan. 10, 2019

(65) Prior Publication Data

US 2019/0235470 A1 Aug. 1, 2019

(30) Foreign Application Priority Data

Feb. 1, 2018 (JP) .............................. JP2018-016178

(51) Int. Cl.
*G05B 19/404* (2006.01)
*B23Q 3/155* (2006.01)
*G01K 15/00* (2006.01)

(52) U.S. Cl.
CPC ....... *G05B 19/404* (2013.01); *B23Q 3/15526* (2013.01); *G01K 15/007* (2013.01);
(Continued)

(58) Field of Classification Search
CPC ............... G01K 15/007; G05B 19/404; B23Q 17/0985; B23Q 3/15526
See application file for complete search history.

(56) References Cited

U.S. PATENT DOCUMENTS

2006/0247888 A1* 11/2006 Kojima .................. B23Q 17/22
    702/130
2008/0144693 A1* 6/2008 Sato ........................ G01K 15/00
    374/1
(Continued)

FOREIGN PATENT DOCUMENTS

CN 101206146 6/2008
CN 102454546 5/2012
(Continued)

OTHER PUBLICATIONS

Notification of Reasons for Refusal dated Oct. 8, 2019 in corresponding Japanese Patent Application No. 2018-016178.
(Continued)

*Primary Examiner* — Vincent H Tran
(74) *Attorney, Agent, or Firm* — Wenderoth, Lind & Ponack, L.L.P.

(57) ABSTRACT

To provide an abnormality determination apparatus, a computer readable medium, an abnormality determination system and an abnormality determination method which can simply detect an abnormality of a temperature in a machine tool without incurring cost. An abnormality determination apparatus which determines abnormality of a temperature sensor in a plurality of machine tools, in which the plurality of machine tools is equivalent machine type, is arranged in equivalent environments, are provided with a temperature sensor at equivalent positions, the abnormality determination apparatus including: a temperature data acquisition unit which acquires temperature data outputted by the temperature sensors from each of the plurality of machine tools; a comparison unit which compares the temperature data acquired by the temperature data acquisition unit; and an abnormality determination unit which determines abnormal-
(Continued)

ity of the temperature sensor based on a comparison result by the comparison unit.

11 Claims, 5 Drawing Sheets

(52) U.S. Cl.
 CPC .............. *G05B 2219/49206* (2013.01); *G05B 2219/49219* (2013.01)

(56) References Cited

U.S. PATENT DOCUMENTS

| | | | |
|---|---|---|---|
| 2009/0140872 A1* | 6/2009 | O'Neal | G05B 9/03 340/679 |
| 2011/0017724 A1* | 1/2011 | Martens | G03F 7/70341 219/494 |
| 2011/0063122 A1* | 3/2011 | Matsubara | G07C 3/08 340/679 |
| 2011/0098975 A1* | 4/2011 | Mazzaro | G01P 21/025 702/183 |
| 2012/0026938 A1* | 2/2012 | Pandey | H04L 43/065 370/328 |
| 2012/0065936 A1* | 3/2012 | Singamsetti | H02S 50/00 702/183 |
| 2014/0005505 A1* | 1/2014 | Peyser | A61B 5/7221 600/316 |
| 2014/0301276 A1* | 10/2014 | Carlsson | H04L 67/12 370/328 |
| 2015/0094988 A1* | 4/2015 | Schumacher | G01M 99/00 702/188 |
| 2016/0254827 A1* | 9/2016 | Akimoto | G06F 11/0793 714/774 |
| 2017/0131710 A1* | 5/2017 | Chen | G05B 19/4065 |
| 2018/0171983 A1* | 6/2018 | Etti | F03D 17/00 |
| 2019/0025770 A1* | 1/2019 | Okita | G06F 16/211 |
| 2019/0031199 A1* | 1/2019 | Dudar | B60W 10/30 |
| 2019/0120159 A1* | 4/2019 | Brinkman | F02D 41/222 |
| 2019/0182929 A1* | 6/2019 | Nishijima | B60Q 11/00 |
| 2019/0232951 A1* | 8/2019 | Dudar | B60R 16/0237 |
| 2019/0235472 A1* | 8/2019 | Maekawa | G05B 19/4065 |

FOREIGN PATENT DOCUMENTS

| | | |
|---|---|---|
| CN | 105929723 | 9/2016 |
| EP | 2 103 378 | 9/2009 |
| JP | 9-236297 | 9/1997 |
| JP | 10-289003 | 10/1998 |
| JP | 2005-238399 | 9/2005 |
| JP | 2008-142844 | 6/2008 |
| JP | 2008-149415 | 7/2008 |
| JP | 2009-175793 | 8/2009 |
| JP | 2013-238351 | 11/2013 |
| JP | 5907802 | 4/2016 |

OTHER PUBLICATIONS

Notification of Reasons for Refusal dated Jan. 8, 2020 in Japanese Patent Application No. 2018-016178.
Office Action dated Jul. 29, 2020 in Chinese Patent Application No. 201910086911.3.
Office Action dated Feb. 17, 2021 in German Patent Application No. 102019200463.6.

* cited by examiner

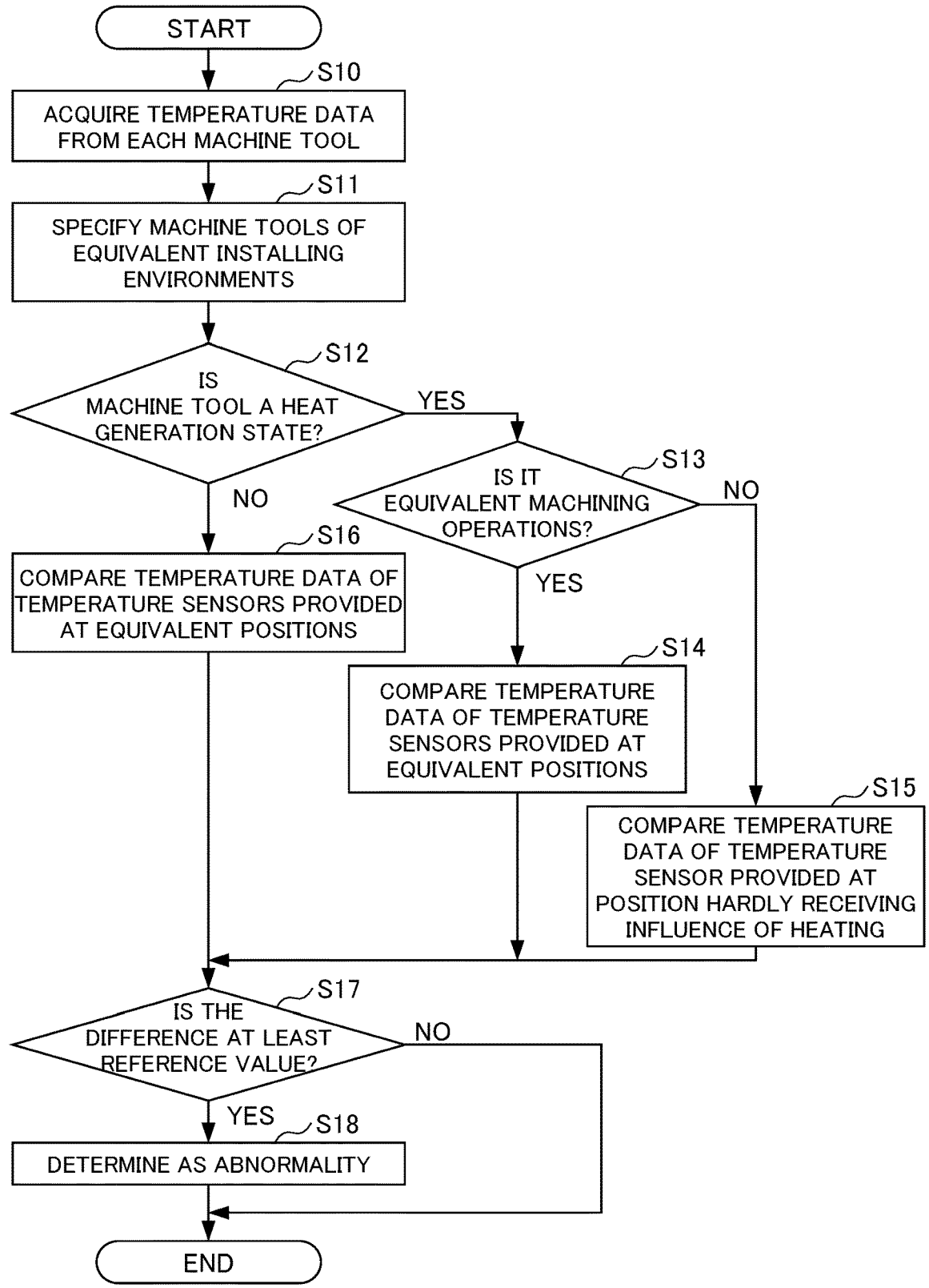

ABNORMALITY DETERMINATION APPARATUS, NON-TRANSITORY COMPUTER READABLE MEDIUM ENCODED WITH A PROGRAM, ABNORMALITY DETERMINATION SYSTEM AND ABNORMALITY DETERMINATION METHOD

This application is based on and claims the benefit of priority from Japanese Patent Application No. 2018-016178, filed on 1 Feb. 2018, the content of which is incorporated herein by reference.

BACKGROUND OF THE INVENTION

Field of the Invention

The present invention relates to an abnormality determination apparatus, a non-transitory computer readable medium encoded with a program, abnormality determination system and abnormality determination method which determines abnormalities in the temperature sensors of a plurality of machine tools.

Related Art

In a machine tool, machining dimensional error occurs due to environmental ambient temperature change and heat generation of the machine tool such as cutting heat. For this reason, thermal displacement compensation technology which compensates the machining dimensional error arising due to heating of the machine tool is being used. As technology which compensates the thermal displacement due to heat generation of this machine tool, for example, there is technology which monitors the state of the machine using a plurality of temperature sensors, and estimates the thermal displacement. This generally installs a temperature sensor to the machine tool, and estimates the thermal displacement amount from the output of the temperature sensor. In an FA (Factory Automation) environment in which this temperature sensor is used, abnormalities tend to occur in the temperature sensor compared to normal usages by the influences such as cutting fluid and chips. In the case of there being an abnormality in the temperature sensor, it is not possible to obtain normal temperature output, from the temperature sensor. Then, in the case of using the output from an erroneous temperature sensor, it is not possible to estimate an accurate thermal displacement amount, and there is concern over negatively impacting machining.

In the case of an abnormality such as disconnect occurring in the temperature sensor, since the temperature sensor will output an incorrect value, it is possible to determine an abnormality in the temperature sensor. However, even if the temperature sensor outputs an incorrect value due to aging degradation or the like, it is not possible to perform abnormality detection with the temperature sensor or measurement instrument alone. In this regard, Patent Documents 1 and 2 disclose methods of detecting abnormalities in a temperature sensor used in the thermal displacement compensation of a machine tool, for example. With the methods described in Patent Documents 1 and 2, a plurality of temperature sensors is arranged at different positions of the machine tool. Then, in the case of variation in detected temperatures of the temperature sensor exceeding a limiting value, or a case of estimating the output of another temperature sensor from the output of one temperature sensor, and as a result of comparing, exceeding a limiting value, it determines as an abnormality.

Patent Document 1: Japanese Unexamined Patent Application, Publication No. 2008-149415
Patent Document 2: Japanese unexamined Patent Application, Publication No. 2008-142844

SUMMARY OF THE INVENTION

However, the methods described in Patent Documents 1 and 2 had to arrange a plurality of temperature sensors in the machine tool. In addition, since the heating state will differ depending on the position at which installing the temperature sensor, a scheme related to the position at which installing the temperature sensors has also been necessary. Furthermore, a technique such as installing a plurality of temperature sensors at the same location has been considered in order to detect an abnormality in a temperature sensor. However, with this technique, the number of temperature sensors or measurement instruments increases, and thus cost rises.

The present invention has an object of providing an abnormality determination apparatus, a non-transitory computer readable medium encoded with a program, abnormality determination system and abnormality determination method which can detect abnormalities in temperature sensors of a machine tool simply without incurring cost.

An abnormality determination apparatus (for example, the "abnormality determination apparatus 1" described later) according to a first aspect of the present invention determines abnormality of a temperature sensor (for example, the "temperature sensor 7" described later) in a plurality of machine tools (for example, the machine tool 4 described later), in which the plurality of machine tools is equivalent unit type, is provided in equivalent environments, are provided with temperature sensors at equivalent positions, and perform equivalent machining processes at equivalent timings; in which the abnormality determination apparatus includes: a temperature data acquisition unit (for example, the "temperature data acquisition unit 11" described later) which acquires temperature data outputted by the temperature sensor from each of the plurality of machine tools; a comparison unit (for example, the "comparison unit 12" described later) which compares the temperature data acquired by the temperature data acquisition unit; and an abnormality determination unit (for example, the "abnormality determination unit 13" described later) which determines an abnormality of the temperature sensor based on a comparison result by the comparison unit.

An abnormality determination apparatus (for example, the "abnormality determination apparatus 1" described later) according to a second aspect of the present invention determines abnormality of a temperature sensor (for example, the "temperature sensor 7" described later) in a plurality of machine tools (for example, the machine tool 4 described later), in which the plurality of machine tools is equivalent unit type, is provided in equivalent environments, are provided with temperature sensors at equivalent positions (for example, the "region 46" described later) which do not receive influence from heat generation accompanying operation, and perform equivalent machining processes at equivalent timings; in which the abnormality determination apparatus includes: a temperature data acquisition unit (for example, the "temperature data acquisition unit 11" described later) which acquires temperature data outputted by the temperature sensor from each of the plurality of machine tools; a comparison unit (for example, the "comparison unit 12" described later) which compares the temperature data acquired by the temperature data acquisition unit; and an abnormality determination unit (for example, the "abnormality determination unit 13" described later) which determines an abnormality of the temperature sensor based on a comparison result by the comparison unit.

An abnormality determination apparatus (for example, the "abnormality determination apparatus 1" described later) according to a third aspect of the present invention determines abnormality of a temperature sensor (for example, the "temperature sensor 7" described later) in a plurality of machine tools (for example, the machine tool 4 described later), in which the plurality of machine tools is equivalent unit type, is provided in equivalent environments, are provided with temperature sensors at equivalent positions, and is a stopped state no generating heat; in which the abnormality determination apparatus includes: a temperature data acquisition unit (for example, the "temperature data acquisition unit 11" described later) which acquires temperature data outputted by the temperature sensor from each of the plurality of machine tools; a comparison unit (for example, the "comparison unit 12" described later) which compares the temperature data acquired by the temperature data acquisition unit; and an abnormality determination unit (for example, the "abnormality determination unit 13" described later) which determines an abnormality of the temperature sensor based on a comparison result by the comparison unit.

According to a fourth aspect of the present invention, in the abnormality determination apparatus as described in any one of the first to third aspects, the abnormality determination unit may determine that the temperature sensor provided in any among the plurality of machine tools is abnormal, in a case or a difference being at least a reference value as a result of the comparison.

According to a fifth aspect of the present invention, in the abnormality determination apparatus as described in any one of the first to fourth aspects, a plurality of the temperature sensors may be provided at different positions to each of the plurality of machine tools, and the comparison unit may compare the temperature data of the temperature sensors having equivalent installing positions on the machine tools.

A sixth aspect of the present invention may be a non-transitory computer readable medium encoded with a program (for example, the "abnormality determination program 16" described later) for causing a computer to function as the abnormality determination apparatus as described in any one of the first to fifth aspects.

An abnormality determination system (for example, the "abnormality determination system 100" described later) according to seventh aspect of the present invention which includes the abnormality determination apparatus as described in any one of the first to fifth aspects may be a server in which the abnormality determination apparatus is communicably connected to the plurality of machine tools.

An abnormality determination system (for example, the "abnormality determination system 200" described later) according to an eighth aspect of the present invention which includes the abnormality determination apparatus (for example, the "abnormality determination apparatus 201" described later) as described in any one of the first to fifth aspects may provide the abnormality determination apparatus to a machine tool (for example, the "machine tool 204" described later) among the plurality of machine tools.

An abnormality determination method according to a ninth aspect of the present invention for temperature sensors (for example, the "temperature sensor 7" described later) in machine tools (for example, the "machine tool 4" described later), which are of equivalent unit type and in equivalent environments, determines a temperature sensor having an abnormality by way of a computer (for example, the abnormality determination apparatus 1 described later) comparing temperature data of the temperature sensors provided at equivalent positions.

According to the present invention, it is possible to provide an abnormality determination apparatus, a non-transitory computer readable medium encoded with a program, abnormality determination system and abnormality determination method which can simply detect abnormality of a temperature sensor in a machine tool, without incurring cost.

BRIEF DESCRIPTION OF THE DRAWINGS

FIG. 4 is a flowchart showing abnormality determination processing of the abnormality determination apparatus of the present embodiment.

DETAILED DESCRIPTION OF THE INVENTION

Embodiment

First, an outline of an embodiment of the present invention will be explained. The present embodiment relates to a system for determining abnormality of a temperature sensor, by comparing the outputs of the temperature sensors provided to a plurality of machine tools in which the installing environments are considered equivalent. The output from the temperature sensor is transmitted to the abnormality determination apparatus from each machine tool to which a temperature sensor is installed. Then, the abnormality determination apparatus determines an abnormality of a temperature sensor by comparing the temperature data received from each machine tool.

Figure 1:
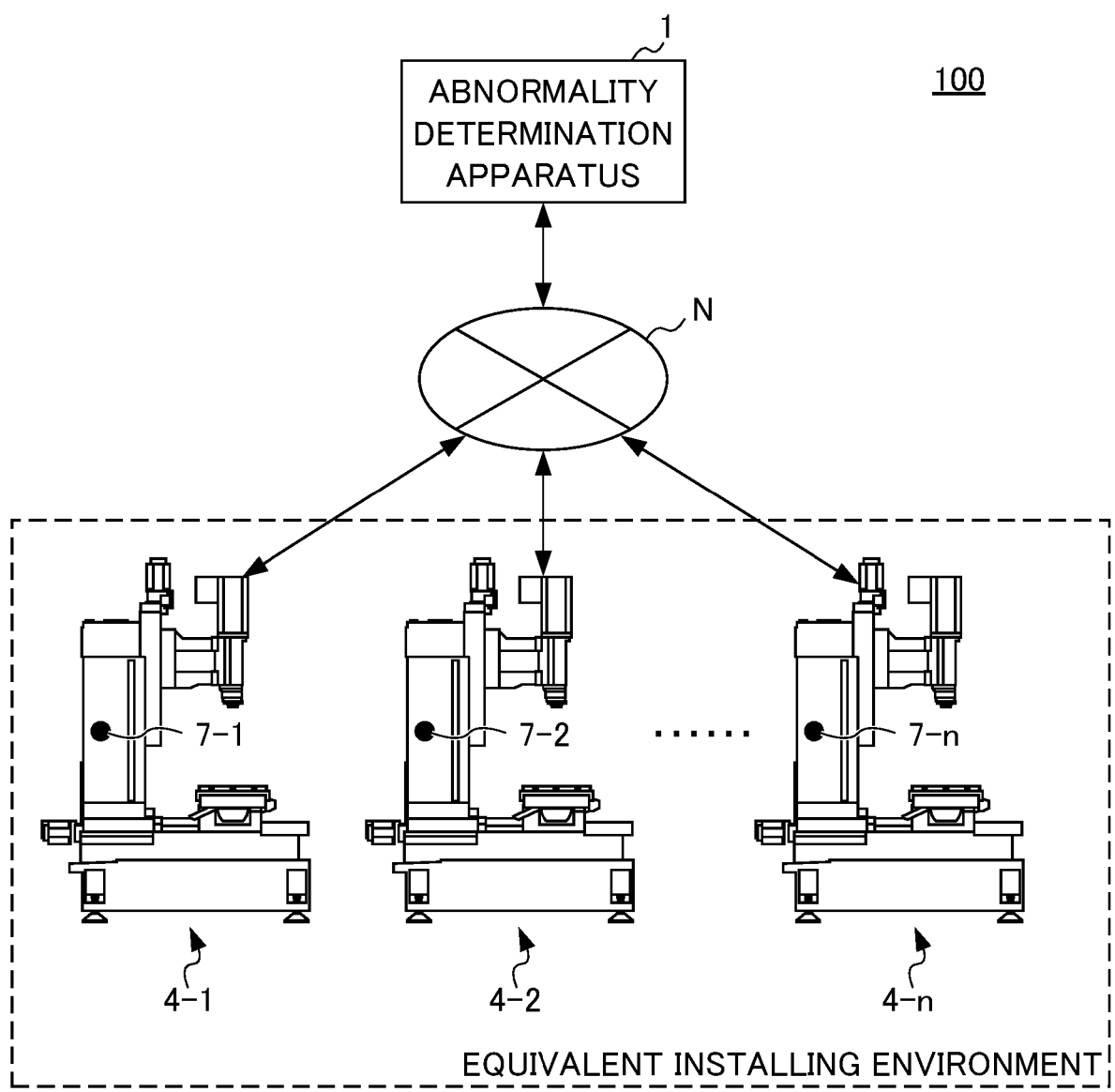
FIG. 1 is a schematic drawing representing the basic configuration of an abnormality determination system of the present embodiment.

Next, an explanation will be made about the configuration of an abnormality determination system 100, which is the present embodiment, by referencing FIG. 1. As shown in FIG. 1, the abnormality determination system 100 includes an abnormality determination apparatus 1, machine tools 4-1, 4-2, . . . , 4-n, and a communication network N. It should be noted that n is an arbitrary natural number of 2 or greater. Then, the machine tools 4-1, 4-2, . . . , 4-n are provided with temperature sensors 7-1, 7-2, . . . , 7-n. It should be noted that, in the case of not distinguishing between the machine tools 4-1, 4-2, . . . , 4-n, they will hereafter be explained as machine tool 4. In addition, in the case of not distinguishing between the temperature sensors 7-1, 7-2, . . . , 7-n, they will hereafter be explained as temperature sensor 7.

The plurality of machine tools 4 and the abnormality determination apparatus 1 are respectively communicably connected to the communication network N. The communication network N, for example, is a LAN (Local Area Network) constructed within a factory, Internet, publication telephone network, or a combination of these. The specific communication system of the communication network N, whether being a wired connection, wireless connection, etc., is not particularly limited. In addition, the plurality of machine tools 4 and abnormality determination apparatus 1 may be connected via an interface.

Figure 2:
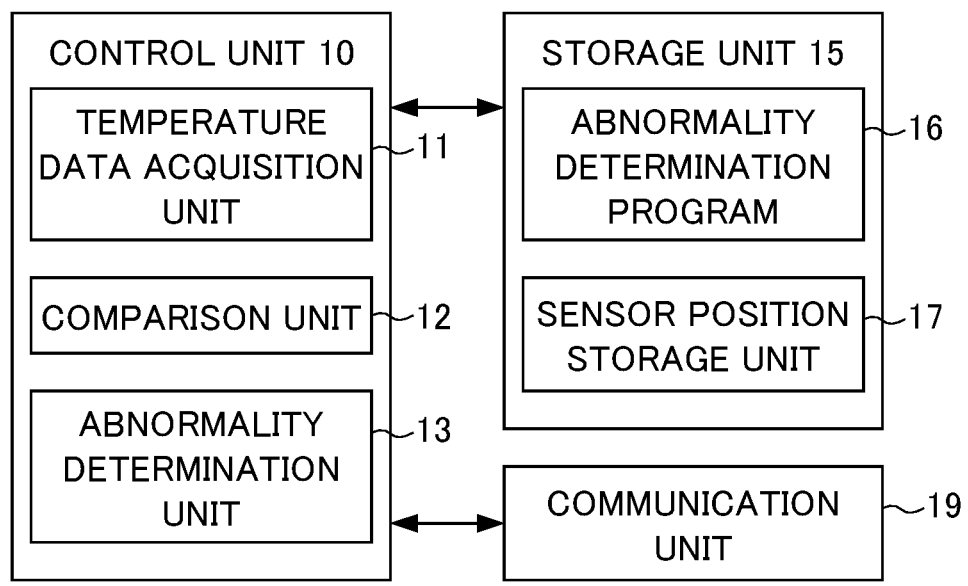
FIG. 2 is a block diagram of an abnormality determination apparatus of the present embodiment.

Next, an explanation will be made for the functional blocks of the abnormality determination apparatus 1 by referencing FIG. 2. The abnormality determination apparatus 1 is a server which determines an abnormality of a temperature sensor 7 by receiving temperature data from a plurality of the machine tools 4, and comparing the received temperature data. The abnormality determination apparatus 1 includes a control unit 10, a storage unit 15, and a communication unit 19. It should be noted that the abnormality determination apparatus 1 may include a display device, an output unit as an output device such as a warning lamp and an audio output unit, and an input unit as an input device such as a keyboard and mouse. The control unit 10 may be a CPU (central processing unit), and integrally controls the abnormality determination apparatus 1, by executing various programs which control the abnormality determination apparatus 1 stored in the storage unit 15. The control unit 10 includes a temperature data acquisition unit 11, a comparison unit 12 and an abnormality determination unit 13. Each of these functional units is realized by the control unit 10 executing programs stored in the storage unit 15 (i.e. abnormality determination program 16).

The temperature data acquisition unit 11 receives temperature data sent from each of the machine tools 4. The temperature data acquisition unit 11 may acquire temperature data together with a machine ID (Identification) which identifies the machine tool 4 that is the sender of the temperature data, and a sensor ID which identifies the temperature sensor 7. Then, the temperature data acquisition unit 11 may associate the received temperature data and the machine ID and/or sensor ID.

The comparison unit 12 compares the received temperature data. In the case of a plurality of temperature sensors 7 being provided at different positions relative to one machine tool 4, the comparison unit 12 compares the temperature data of the temperature sensors 7 provided at equivalent positions. Then, the comparison unit 12, for example, compares whether or not the difference between the plurality of temperature data sets is less than a reference value.

The abnormality determination unit 13 determines that the temperature sensor 7 is abnormal in the case of the difference being at least the reference value as a result of comparison by the comparison unit 12. Herein, in the case of comparing the temperature data which is the output of the temperature sensors 7 of two machine tools 4, the abnormality determination unit 13 can determine that either one among the two temperature sensors 7 which are the senders of temperature data is abnormal. In addition, in the case of comparing three of more sets of temperature data which are the outputs of the temperature sensors 7 of three or more machine tools 4, the abnormality determination unit 13 can determine which temperature sensor 7 is abnormal according to the respective comparison results of the two sets of temperature data. In this case, except for a case of a plurality of temperature sensors 7 becoming abnormal at the same time, the abnormality determination unit 13 can basically determine the one temperature sensor 7 which is abnormal.

The storage unit 15 is a storage area that stores programs, etc. which are executed by the control unit 10. The storage unit 15 stores an abnormality determination program 16 which executes various functions of the aforementioned control unit 10. In addition, the storage unit 15 stores a sensor position storage part 17. The sensor position storage part 17, for example, stores a machine ID provided by the temperature sensor 7, and an installing position of the temperature sensor 7 in the machine tool 4, with the sensor ID as a key. The communication unit 19 is a communication control device that performs sending/receiving of data with the machine tool 4 via the communication network N.

Next, the machine tool 4 and temperature sensor 7 will be explained based on FIGS. 1, 3A and 3B. The machine tool 4 is a machine which performs predetermined machining such as cutting on a workpiece such as a component, based on an operation command outputted by a numerical control device (not shown). This example explains the machine tool 1 as having the three translational axes (X, Y, Z axes) which are mutually orthogonal, as the drive axes; however, it is not limited thereto.

In the present embodiment, the plurality of machine tools 4 is provided in a factory in which the installing environments are considered equivalent. Herein, installing environments being equivalent is judged based on a predetermined reference set in advance. More specifically, for example, the plurality of machine tools 4 is machines which perform work in the same production line. In addition, even if the plurality of machine tools 4 is tools which perform work in different production lines, so long as being kept at the same temperature by air conditioning, this plurality of machine tools 4 may be equivalent environments. These are examples, and not limited thereto. The user can arbitrarily set in advance the predetermined reference. In addition, the plurality of machine tools 4 shall be equivalent unit types. Herein, unit types being equivalent is judged based on a predetermined reference set in advance. Herein, unit type, for example, indicates the model number, version, options, etc. of the machine tool 4. For example, equivalent unit type refers to the unit type being the same, and may include some version variation such as variation in options. It should be rioted that this is an example, and is not to be limited thereto. The user can arbitrarily set in advance a predetermined reference. In this way, the plurality of machine tools 4 explained in the present embodiment are tools having equivalent unit type, and provided in a factory in which the installing environments are considered equivalent.

Each of the plurality of machine tools 4 stores a machining program (not shown) for performing machining processing. Herein, the plurality of machine tools 4 preferably performs equivalent machining operations; however, the present embodiment does not make essential that the plurality of machine tools 4 performs equivalent machining operations as described later (Example 2 and Example 3). It should be noted that machining operations being equivalent is judged based on a predetermined reference set in advance. For example, the equivalent machining operations includes equivalent machining programs, and may be able to perform equivalent machining simultaneously by way of equivalent machining programs. Herein, for example, equivalent machining programs may include, other than the machining programs being identical, machining programs which are version variations in the program, and the substantial processing being the same, etc. It should be noted that these are examples, and not to be limited thereto. The user can arbitrarily set in advance a predetermined reference. Unless otherwise stated, hereinafter, the installing environments, machine tools and machining operations matching the predetermined references set in advance are referred to as equivalent installing environments, equivalent machine tools and equivalent machining operations, respectively.

As shown in FIG. 1, the plurality of machine tools 4 has temperature sensors 7 provided at equivalent positions. Herein, equivalent positions refer to the installing positions of the temperature sensors 7 to the machine tools 4 being the same; however, a shift within a predetermined range set in advance is permitted. Herein, there is no limitation in the number of temperature sensors 7 provided to one machine tool 4. As shown in FIG. 1, it is sufficient so long as at least one temperature sensor 7 is provided to each machine tool 4. The temperature sensor 7 detects the temperature of the machine tool 4. The temperature sensor 7 tends to receive or hardly receives the influence of heating depending on the mounting position on the machine tool 4.

Figure 3A:
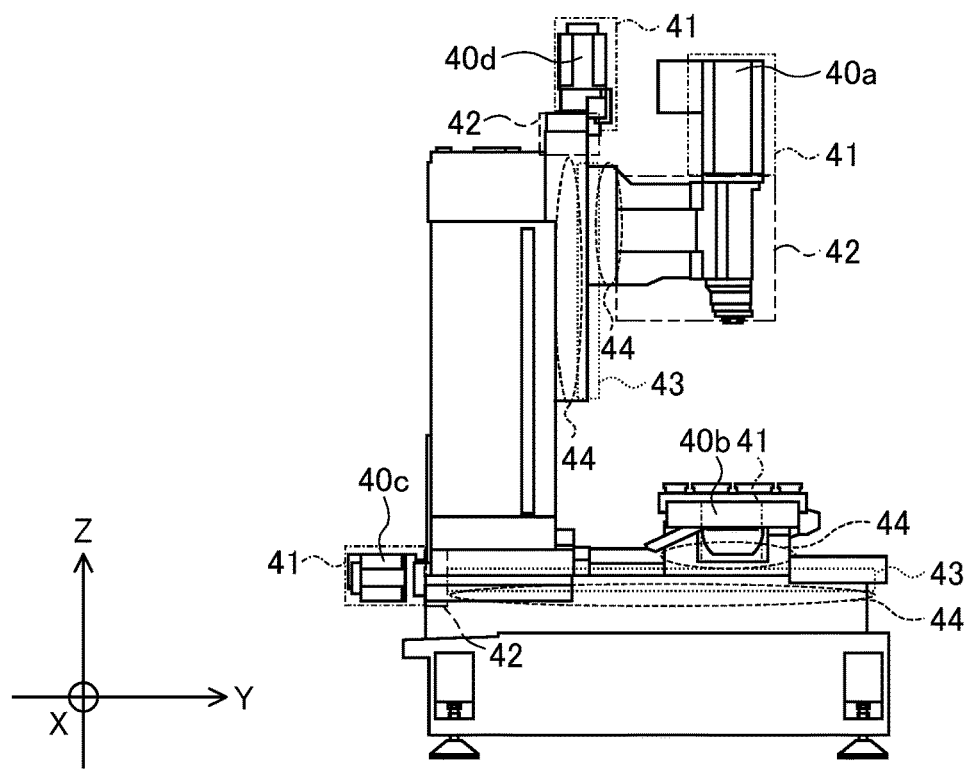
FIG. 3 is a views for explaining about heat generation of a machine tool in the present embodiment.
FIG. 3B is a view for explaining about cooling of a machine tool in the present embodiment.

FIG. 3A is a view of the machine tool 4 seen from the X-axis direction. The machine tool 4 includes various motors including a main axis motor 40a, X-axis motor 40b, Y-axis motor 40c, and Z-axis motor 40d. Due to the motors being heat sources, in the case of providing the temperature sensor 7 to a motor region 41 having the motor, the temperature sensor 7 receives the influence of heating. Next, a motor adjacent area 42 which is adjacent to the motor receives the heat conduction from the heat generation of the motor produced when the motor operates. For this reason, in the case of providing the temperature sensor 7 to the motor adjacent area 42, the temperature sensor 7 will receive the influence of heat generation. In addition, a sliding area 43 from operation of the motor generates heat upon a ball screw or linear guide sliding accompanying the operation of the shaft. For this reason, in the case of providing the temperature sensor 7 to the sliding area 43, the temperature sensor 7 receives the influence of heat generation. Furthermore, a sliding adjacent area 44 adjacent to the sliding area 43 receives heat conduction from the heat generation by sliding. For this reason, in the case of providing the temperature sensor 7 to the sliding adjacent area 44, the temperature sensor 7 receives the influence of heat generation.

Figure 3B:
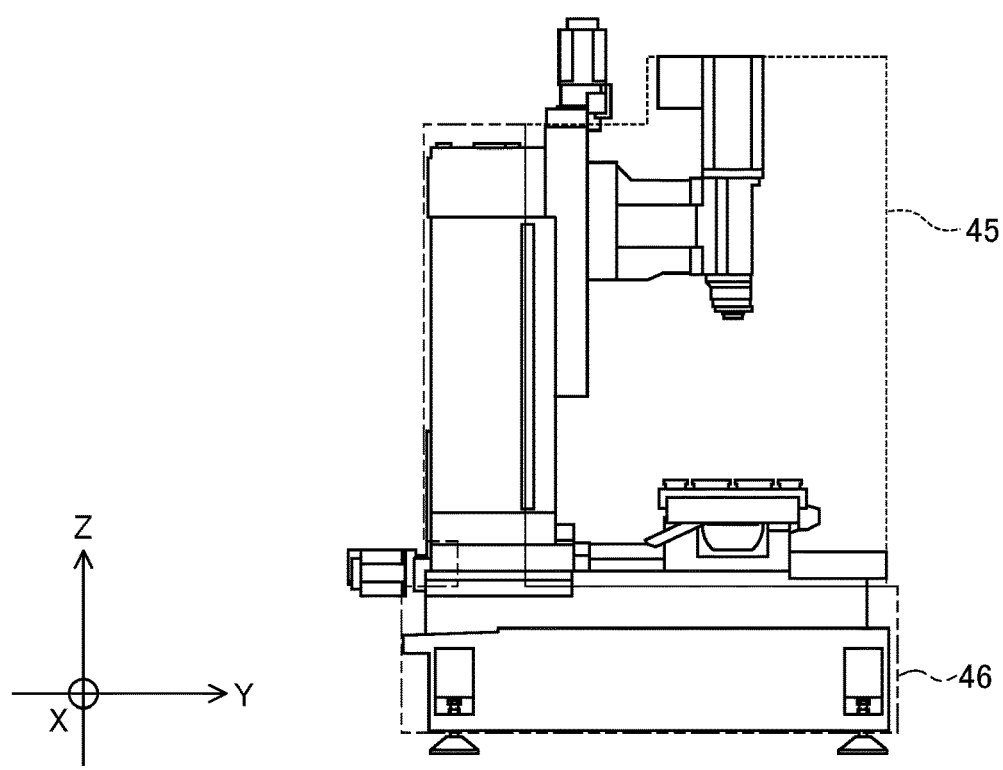

As shown in FIG. 3B, the machine tool 4 covers the machining space with a cover or the like. The machining space is a space directly subjected to cutting fluid, subjected to scattered cutting fluid, and filled by mist of cutting oil. For this reason, the machining space receives the influence of cutting fluid. The cutting fluid is sprayed from a nozzle provided to the spindle (not shown), and after applying to the workpiece, etc. on which performing the machining, is discharged to outside along with chips. For this reason, a cooling area 45 including the inside of the machining space and an adjacent area of the machining space tends to receive the influence of cooling by the cutting fluid. On the other hand, an area 46 excluding the aforementioned various heating influence areas and cooling area 45 hardly receives the influence of heating and cooling.

The temperature sensor 7 is a thermistor or the like, and outputs a temperature detection signal. The machine tool 4 digitizes the temperature detection signal by a known method, and obtains the temperature data representing the temperature by a numerical value.

Next, examples capable of discriminating the abnormality of a temperature sensor 7 in the present embodiment will be explained.

Example 1

Example 1 is an example of the plurality of machine tools 4 being equivalent machine tools which are in equivalent installing environments, and doing equivalent machining operations. In this case, it can be considered that the plurality of machine tools 4 have equal heat generation states. Consequently, the temperature data indicated by the temperature detection signal outputted by the temperature sensors 7 mounted to the equivalent position will be equal. Therefore, in the case of the difference being at least the reference value by comparing the temperature data from the temperature sensors 7 mounted to each of the plurality of machine tools 4, it is possible to determine either temperature sensor 7 is abnormal.

Example 2

Example 2 is a case in which the plurality of machine tools 4 is equivalent machine tools which are in equivalent installing environments, but the machining operations differ. For example, it corresponds to a case of each of the plurality of machine tools 4 including different machining programs and performing different machining, and a case of each of the plurality of machine tools 4 including equivalent machining programs, but performing the equivalent machining at different timings. In this case, the plurality of machine tools 4 are considered to have different heat generation states due to the machining operations differing. However, for the temperature of a position which hardly receives the influence of heat generation by the machining operation, the change in temperature from the surrounding environment is dominant. Consequently, the temperature data indicated by the temperature detection signal outputted by the temperature sensor 7 mounted at the equivalent position which hardly receives the influence of heat generation becomes equal. Therefore, in the case of the difference being at least the reference value by comparing the temperature data from the temperature sensors 7 mounted to each of the plurality of machine tools 4, it can be determined that either temperature sensor 7 is abnormal. Since this example can determine abnormality by mounting the temperature sensor 7 to a position which hardly received the influence of heat generation, the determination of abnormality of the heat sensor 7 becomes easy, even if being different machining operations.

Example 3

Example 3 is a case of a state in which the plurality of machine tools 4 are equivalent machine tools which are in equivalent installing environments, and are not generating heat. State of not generating heat refers to a stopped state in which the respective machine tools 4 are not operating. In this case, the temperature sensors 7 mounted to the plurality of machine tools 4 will make outputs according to the temperature of the surrounding environment. Consequently, the temperature data indicated by the temperature detection signal outputted by the temperature sensors 7 mounted to equivalent positions are equal. Therefore, in the case of the difference being at least the reference value by comparing the temperature data from the temperature sensors 7 mounted to each of the plurality of machine tools 4, it is possible to determine that either of the temperature sensors 7 is abnormal. This example can determine abnormality of the temperature sensor 7, even when a stopped state in which the machine tools 4 are not during operation.

Next, the processing explained in the aforementioned Examples 1 to 3 will be explained along with the configuration of the installing environment. As a premise, the plurality of machine tools 4 is equivalent machine tools. FIG. 4 a flowchart showing the abnormality determination processing of the abnormality determination apparatus 1. In Step (hereinafter Step S referred to simply as S) 10 in FIG. 4, the control unit 10 (temperature data acquisition unit 11) of the abnormality determination apparatus 1 acquires temperature data by receiving temperature data sent from each of the machine tools 4. Herein, the temperature data acquisition unit 11 continues to acquire temperature data sent from the machine tools 4 at the appropriate timing.

In S11, the control unit 10 specifies the machine tools 4 in the equivalent installing environment. The control unit 10 judges whether or not being equivalent installing environments based on a predetermined evaluation criteria set in advance. More specifically, the machine tools 4 in the equivalent installing environment may be stored in the storage unit 15 to be associated as machine tools 4 of the equivalent installing environment in advance.

In S12, the control unit 10 judges whether or not the plurality of machine tools 4 which are in the equivalent installing environment are a heat generating state. The control unit 10, for example, can judge whether or not the machine tools 4 are a heat generating state by receiving operating status data from each machine tool 4. The operating status data, for example, is data based on an internal behavior signal of the numerical control device (not shown) acquired at a predetermined sampling period (For example 1 msec) in time sequence, feed shaft control data detected from the motor of the machine tool 4, spindle control data related to the spindle, etc. In the case of the plurality of machine tools 4 being a heat generating state (S12: YES), the control unit 10 advances the processing to S13. On the other hand, in the case of the plurality of machine tools 4 not being a heat generating state (S12: NO), i.e. being a stopped state, the control unit 10 advances the processing to S16.

In S13, the control unit 10 judges whether or not the plurality of machine tools 4 which are in the equivalent installing environment performs equivalent machining operations. The control unit 10 judges whether or not being equivalent machining operations based on the predetermined evaluation criteria set in advance. In the case of the plurality of machine tools 4 performing equivalent machining operations (S13: YES), the control unit 10 advances the processing to S14. On the other hand, in the case of the plurality of machine tools 4 not performing equivalent machining operations (S13: NO), the control unit 10 advances the processing to S15.

In S14, the control unit 10 (comparison unit 12) compares the temperature data of temperature sensors 7 provided at equivalent positions. Herein, in the case of each of the plurality of temperature sensors 7 being provided to different positions on the machine tool and the position thereof being equivalent in the plurality of machine tools 4, it is sufficient if the control unit 10 compares the temperature data of the temperature sensors 7 for every position at which the temperature sensor 7 is provided. Furthermore, if the positions at which the temperature sensors 7 are equivalent in the plurality of machine tools 4, it may be a temperature sensor 7 provided at any position irrespective of whether receiving the influence of heat generation. Subsequently, the control unit 10 advances the processing to S17.

In S15, the control unit 10 (comparison unit 12) compares the temperature data of temperature sensors 7 provided at a position hardly receiving the influence of heating and cooling. Herein, position hardly receiving the influence of heating and cooling, for example, refers to the area 46 shown in FIG. 3B. It should be noted that, in the case of the temperature sensor 7 being provided at a position tending to receive the influence of heating and cooling of the machine tool 4, since the heat generation extent varies depending on the machining process contents of each machine tool 4, it is not possible to determine abnormality of the temperature sensor 7. For this reason, in the case of not performing equivalent machining operations, it is necessary to compare the temperature data of the temperature sensors 7 provided at a position hardly receiving the influence of heating and cooling. Subsequently, the control unit 10 advances the processing to S17.

In S16, the control unit 10 (comparison unit 12) compares the temperature data of temperature sensors 7 provided at equivalent positions. In S17, the control unit 10 (abnormality determination unit 13) determines whether the difference is at least the reference value, as a result of comparing temperature data. In the case of the difference being at least the reference value (S17: YES), the control unit 10 advances the processing to S18. On the other hand, in the case of the difference being less than the reference value (S17: NO), the control unit 10 ends the present processing. In other words, case of the difference being less than the reference value indicates all of the temperature sensors 7 provided to the plurality of machine tools 4 not being abnormal. It should be noted that, in the case of the difference being less than the reference value, the control unit 10 shall end the present processing; however, it may be configured so as to end the present processing after making report of the fact of being normal.

In S18, the control unit 10 (abnormality determination unit 13) determines at least one among the temperature sensors 7 provided to the plurality of machine tools 4 is abnormal. It should be noted that the control unit 10 may feedback the determination results to the machine tools 4, and may output to an output unit (not shown) of the abnormality determination apparatus 1. As an output method, it can be considered to output an error on a screen, turn on a warning lamp, and make an output by sound. Subsequently, the control unit 10 ends the present processing.

According to the above, the abnormality determination system 100 can easily detect abnormality of the temperature sensor 7 provided at equivalent positions without incurring cost, so long as the plurality of machine tools 4 provided in equivalent installing environments are equivalent machine tools.

More specifically, in the case of the machine tool 4 being the heat generation state, i.e. case of the power source being turned on, the machining program actually being executed and a machining process being performed, for example, when performing equivalent machining operations, the temperature data detected by the temperature sensors 7 provided at equivalent positions of each machine tool 4 is considered to indicate almost the same temperature. For this reason, as a result of comparing a plurality of sets of temperature data, in the case of the difference being at least the reference value, it is possible to determine at least one temperature sensor 7 as being abnormal.

In addition, in the case of the machine tools 4 being a heat generation state, i.e. case of the power source being turned on, the machining program actually being executed and a machining process being performed, even when the processing is being executed by different machining programs, so long as being temperature sensors 7 provided at a position hardly receiving the influence of heat generation, the temperature data received from each machine tool 4 is considered to indicate almost the same temperature. Consequently, as a result of comparing a plurality of sets of temperature data, in the case of the difference being at least the reference value, it can be determined as at least one temperature sensor 7 being abnormal.

Furthermore, in the case of the machine tool 4 not being a heat generation state, i.e. case of only the power source for sending data being turned on, and electric power not being supplied to the motor, etc., even if temperature sensors 7 provided at any position of the machine tool 4, the temperature data detected by a temperature sensor 7 provided at an equivalent position is considered to indicate almost the same temperature. For this reason, as a result of comparing a plurality of sets of temperature data, in the case of the difference being at least the reference value, it can be determined as at least one temperature sensor 7 being abnormal.

Due to receiving the temperature data from a plurality of machine tools 4, the abnormality determination apparatus 1 can centrally manage the states of the temperature sensor 7 including abnormality. The abnormality determination apparatus 1 includes a sensor position storage unit 17. The sensor position storage unit 17 includes a sensor ID of temperature sensors 7 which includes the positions of the temperature sensors 7, and the machine ID of the machine tools 4. So long as having information related to the mounting position of the temperature sensor 7, installing position and model type of machine tool 4 in this sensor position storage unit 17, the abnormality determination apparatus 1 can confirm whether the temperature sensors 7 are mounted at equivalent positions, whether in equivalent installing environments, and whether being equivalent machine tools by referencing the sensor position storage unit 17, and thus is convenient.

The programs including the abnormality determination program used in the present invention can be stored using various types of non-transitory computer readable media, and supplied to a computer. Non-transitory computer readable media includes various types of tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the program may be provided to a computer by way of various types of transitory computer readable media. Examples of transitory computer readable media include electrical signals, optical signals and electromagnetic waves. Transitory computer readable media can provide programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and realization is possible in a form achieved by conducting various modifications in a scope not departing from the gist of the present invention.

Modified Example 1

Figure 5:
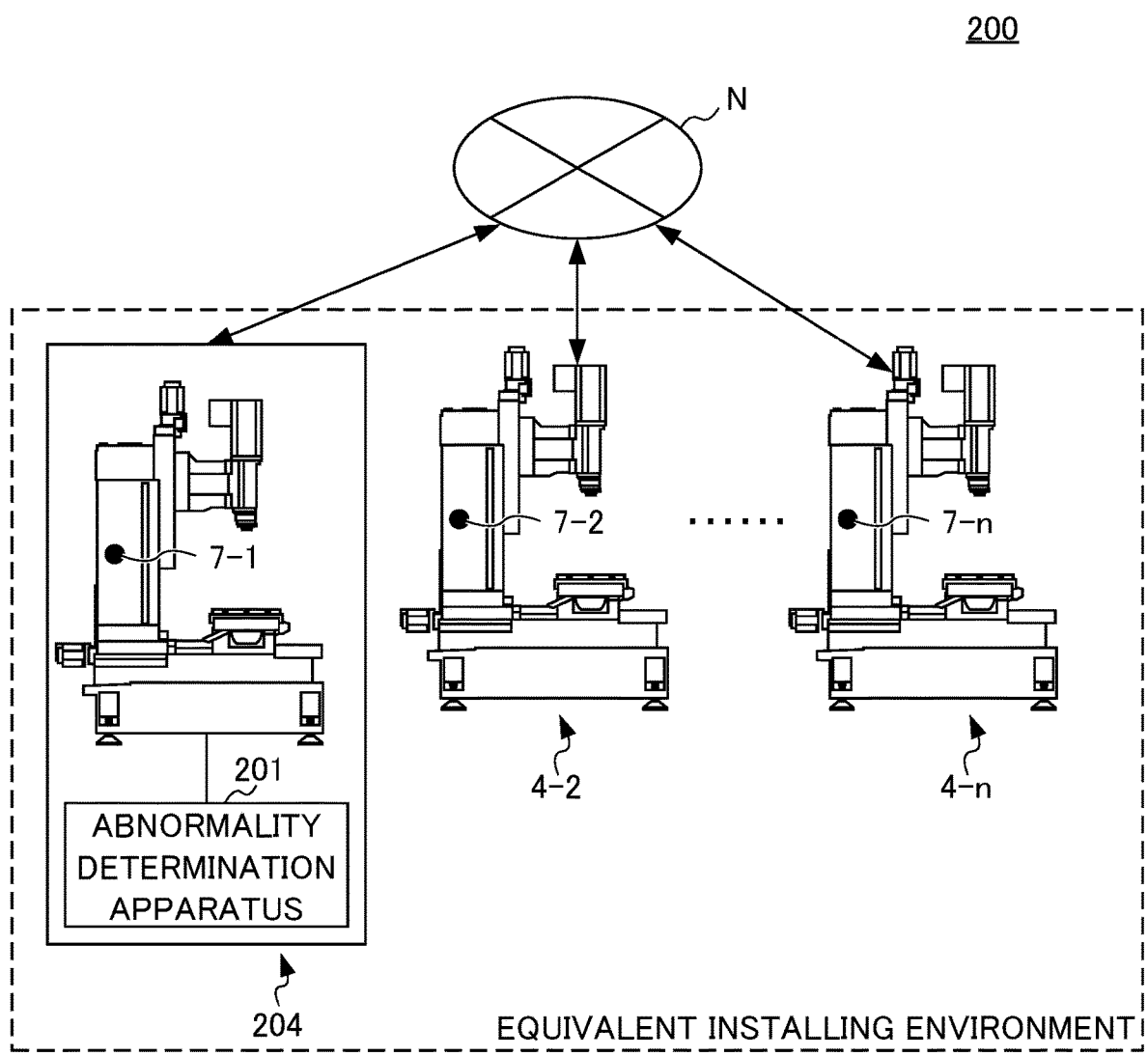
FIG. 5 is a schematic drawing representing a basic configuration of an abnormality determination system of a modified embodiment.

In the aforementioned embodiment, the abnormality determination apparatus 1 communicably connected to the plurality of machine tools 4 is explained as determining abnormalities of temperature sensors 7; however, it is not limited thereto. As shown in FIG. 5, it may be an abnormality determination system 200 including an abnormality determination apparatus 201 in one machine tool 204, and communicably connecting the machine tool 204 and other machine tools 4 (4-2, . . . , 4-n) in an installing environment equivalent with this machine tool 204 by way of the communication network N. Even if being the abnormality determination system 200, it is possible to determine abnormalities of the temperature sensors 7 by way of the abnormality determination apparatus 201.

Modified Example 2

In the aforementioned embodiment, a system in which the machine tool 4 generates temperature data based on the temperature detection signal from the temperature sensors 7 is explained as an example; however, it is not limited thereto. The machine tool 4 may transmit the temperature detection signal as is to the abnormality determination apparatus 1, and generate temperature data from the temperature detection signal in the abnormality determination apparatus 1.

EXPLANATION OF REFERENCE NUMERALS

1, 201 abnormality determination apparatus
4, 4-1, 4-2, . . . , 4-n, 204 machine tool
7, 7-1, 7-2, . . . , 7-n temperature sensor
10 control unit
11 temperature data acquisition unit
12 comparison unit
13 abnormality determination unit
15 storage unit
16 abnormality determination program
17 sensor position storage unit
41 motor area
42 motor adjacent area
43 sliding area
41 sliding adjacent area
45 cooling area
46 area
100, 200 abnormality determination system

What is claimed is:

1. An abnormality determination apparatus which determines abnormality of a temperature sensor in a plurality of machine tools,
   wherein the plurality of machine tools are of equivalent unit type, are provided in equivalent environments, and are provided with temperature sensors at equivalent positions,
   wherein the abnormality determination apparatus is configured to:
   acquire temperature data outputted by the temperature sensors;
   determine whether or not the plurality of machine tools are in a heat generation state;
   determine whether or not the plurality of machine tools are performing equivalent machine operations upon a determination that the plurality of machine tools are in the heat generation state;
   compare the acquired temperature data upon a determination that the plurality of machine tools are performing equivalent machine operations; and
   determine whether or not one or more of the temperature sensors is abnormal based on a comparison result of the acquired temperature data,
   wherein each of the plurality of machine tools is a machine which performs predetermined machining on a workpiece based on an operation command outputted by a numerical control device, and wherein the predetermined machining performed on the workpiece comprises a cutting operation performed on a component.

2. The abnormality determination apparatus according to claim 1,
wherein the abnormality determination apparatus is configured to determine that the temperature sensor provided in any among the plurality of machine tools is abnormal, in a case of a difference being at least a reference value as a result of the comparison.

3. The abnormality determination apparatus according to claim 1,
wherein a plurality of the temperature sensors is provided at different positions to each of the plurality of machine tools, and
wherein the abnormality determination apparatus is configured to compare the temperature data of the temperature sensors having equivalent installing positions on the machine tools.

4. An abnormality determination system comprising the abnormality determination apparatus according to claim 1,
wherein the abnormality determination apparatus is a server which is communicably connected to the plurality of machine tools.

5. An abnormality determination system comprising the abnormality determination apparatus according to claim 1,
wherein the abnormality determination apparatus is equipped to one machine tool among the plurality of machine tools.

6. An abnormality determination apparatus which determines abnormality of a temperature sensor in a plurality of machine tools,
wherein the plurality of machine tools are of equivalent unit type, are provided in equivalent environments, and are provided with a first plurality of temperature sensors at equivalent positions which do not receive influence from a heat generation accompanying operation, and a second plurality of temperature sensors at equivalent positions which receive influence from the heat generation accompanying operation,
wherein the abnormality determination apparatus is configured to:
acquire temperature data outputted by the first plurality of temperature sensors and the second plurality of temperature sensors;
determine whether or not the plurality of machine tools are in a heat generation state;
determine whether or not the machine tools are performing equivalent machine operations upon a determination that the plurality of machine tools are in the heat generation state;
compare the acquired temperature data of the first plurality of temperature sensors upon a determination that the plurality of machine tools are not performing equivalent machine operations; and
determine whether or not one or more of the first plurality of temperature sensors is abnormal based on a comparison result of the acquired temperature data of the first plurality of temperature sensors.

7. An abnormality determination apparatus which determines abnormality of a temperature sensor in a plurality of machine tools,
wherein the plurality of machine tools are of equivalent unit type, are provided in equivalent environments, and are provided with temperature sensors at equivalent positions, wherein the abnormality determination apparatus is configured to:
acquire temperature data outputted by the temperature sensors;
determine whether or not the plurality of machine tools are in a heat generation state;
compare the acquired temperature data upon a determination that the plurality of machine tools are not in the heat generation state; and
determine an abnormality of the temperature sensor based on a comparison result of the acquired temperature data,
wherein each of the plurality of machine tools is a machine which performs predetermined machining on a workpiece based on an operation command outputted by a numerical control device, and
wherein the predetermined machining performed on the workpiece comprises a cutting operation performed on a component.

8. A non-transitory computer readable medium encoded with a program for causing a computer to function as an abnormality determination apparatus which determines abnormality of a temperature sensor in a plurality of machine tools,
wherein the plurality of machine tools are of equivalent unit type, are provided in equivalent environments, and are provided with temperature sensors at equivalent positions,
wherein the abnormality determination apparatus is configured to:
acquire temperature data outputted by the temperature sensors;
determine whether or not the plurality of machine tools are in a heat generation state;
determine whether or not the plurality of machine tools are performing equivalent machine operations upon a determination that the plurality of machine tools are in the heat generation state;
compare the acquired temperature data upon a determination that the plurality of machine tools are performing equivalent machine operations; and
determine whether or not one or more of the temperature sensors is abnormal based on a comparison result of the acquired temperature data,
wherein each of the plurality of machine tools is a machine which performs predetermined machining on a workpiece based on an operation command outputted by a numerical control device, and
wherein the predetermined machining performed on the workpiece comprises a cutting operation performed on a component.

9. An abnormality determination method for temperature sensors in a plurality of machine tools,
wherein the plurality of machine tools are of equivalent unit type, are provided in equivalent environments, and are provided with temperature sensors at equivalent positions, and
wherein each of the plurality of machine tools is a machine which performs predetermined machining on a workpiece based on an operation command outputted by a numerical control device,
the method comprising:
acquiring temperature data outputted by the temperature sensors;
determining whether or not the plurality of machine tools are in a heat generation state;

determining whether or not the plurality of machine tools are performing equivalent machine operations upon a determination that the plurality of machine tools are in the heat generation state;

comparing the acquired temperature data upon a determination that the plurality of machine tools are performing equivalent machine operations; and determining whether or not one or more of the temperature sensors is abnormal based on a comparison result of the acquired temperature data, wherein the predetermined machining performed on the workpiece comprises a cutting operation performed on a component.

10. An abnormality determination method for temperature sensors in a plurality of machine tools, wherein the plurality of machine tools are of equivalent unit type, are provided in equivalent environments, and are provided with a first plurality of temperature sensors at equivalent positions which do not receive influence from a heat generation accompanying operation, and a second plurality of temperature sensors at equivalent positions which receive influence from the heat generation accompanying operation, the method comprising:

acquiring temperature data outputted by the first plurality of temperature sensors and the second plurality of temperature sensors;

determining whether or not the plurality of machine tools are in a heat generation state;

determining whether or not the machine tools are performing equivalent machine operations upon a determination that the plurality of machine tools are in the heat generation state;

comparing the acquired temperature data of the first plurality of temperature sensors upon a determination that the plurality of machine tools are not performing equivalent machine operations; and determining whether or not one or more of the first plurality of temperature sensors is abnormal based on a comparison result of the acquired temperature data of the first plurality of temperature sensors.

11. An abnormality determination method for temperature sensors in a plurality of machine tools, wherein the plurality of machine tools are of equivalent unit type, are provided in equivalent environments, and are provided with temperature sensors at equivalent positions, and wherein each of the plurality of machine tools is a machine which performs predetermined machining on a workpiece based on an operation command outputted by a numerical control device, the method comprising:

acquiring temperature data outputted by the temperature sensors;

determining whether or not the plurality of machine tools are in a heat generation state;

comparing the acquired temperature data upon a determination that the plurality of machine tools are not in the heat generation state; and determining an abnormality of the temperature sensor based on a comparison result of the acquired temperature data, wherein the predetermined machining performed on the workpiece comprises a cutting operation performed on a component.

* * * * *